United States Patent Office 3,360,345
Patented Dec. 26, 1967

3,360,345
DRY HEATING PROCESS FOR PREPARATION OF ANTACID COMPOUNDS
Seymour Z. Lewin, Bayside, N.Y., assignor to Warner-Lambert Pharmaceutical Company, Morris Plains, N.J., a corporation of Delaware
No Drawing. Filed Mar. 22, 1963, Ser. No. 268,512
7 Claims. (Cl. 23—315)

This invention relates particularly to novel processes for producing buffering compositions. This invention also relates to certain novel buffering compositions some of which are particularly useful in the treatment of gastric hyperacidity.

This application is a continuation-in-part of my copending application Ser. No. 713,685, filed Feb. 6, 1958, now Patent No. 3,115,385.

All buffering compositions heretofore have been prepared by what may be called wet processes, i.e., they involve the reaction of the reactants in a water medium or other diluent medium. This invention provides for the preparation of buffering compounds of widely varying chemical compositions by what may be called "dry processes." While the discussion following will be with respect to aluminum hydroxide-sodium bicarbonate reaction products, it should be understood that this is for illustration purposes only and that the invention may be employed using entirely different reactants than those mentioned above.

Presently known buffers such as those which are reaction products of aluminum hydroxide and sodium bicarbonate are generally prepared by reacting these two reagents in aqueous solution. The aluminum hydroxide, in turn, is generally prepared by precipitation from an acidic aluminum salt, e.g., aluminum sulfate or aluminum chloride, by the addition of an alkaline reagent such as ammonia, sodium bicarbonate, and the like. The acid consuming power of these reaction products can be and is adversely influenced by conditions both during and after precipitation of the aluminum hydroxide and the buffer itself. Such factors include the presence of foreign ions during precipitation as well as heating and aging, the latter two both adversely affecting the reactivity of the reaction product toward acids.

An object of the present invention is to provide a process for producing buffer compositions of high acid consuming power by the reaction of aluminum hydroxide with a mildly alkaline-reacting salt.

Another object of this invention is to provide a process for heating a mixture of aluminum hydroxide and a mildly alkaline salt in the dry state to produce buffers of high acid consuming power.

Still another object of this invention is to prepare new buffer compositions which are reaction products of aluminum hydroxide with an alkali metal or ammonium bicarbonate.

A still further object of this invention is to prepare new buffer compositions which are reaction products of aluminum hydroxide with an alkali metal acid phosphate, and optionally, also an alkali metal bicarbonate.

These and other objects will be apparent from the disclosure which follows.

According to the novel process of this invention, a mixture of dry, finely divided solid aluminum hydroxide and a dry, finely divided solid mildly alkaline reacting salt selected from the group consisting of the alkali metal and ammonium bicarbonates and acid phosphates is heated at a temperature of about 80° to about 180° F. for 5 minutes to 6 hours. The materials are heated to reaction temperature at a rate not less than 1° C. and not greater than 50° C. per minute. A reaction ensues, and the resulting reaction product is a buffer composition having high acid consuming power. In order to insure the desired reaction, the particle size of all reagents should be no greater than 230 mesh.

In one embodiment of the present process an alkali metal bicarbonate or ammonium bicarbonate and aluminum hydroxide are mixed together in a mol ratio ranging from about 0.05:1 to about 8:1 or higher and heated in the dry state at a temperature of about 80° C. to about 180° C. Sodium bicarbonate is a preferred reagent because of its low cost and the high acid consuming power of the resulting products. Potassium bicarbonate also gives products having high acid consuming power, in fact, generally higher than products formed from equimolar quantities of sodium bicarbonate. Ammonium bicarbonate can also be used, but the resulting products usually have slightly lower acid consuming power than the corresponding products prepared from sodium bicarbonate.

The quantities of alkali metal and carbon dioxide in the product depend on the reagent ratio of alkali metal bicarbonate to aluminum hydroxide as well as the temperature and time of heating. Only a portion of the bicarbonate reagent becomes chemically combined with aluminum hydroxide, and this portion generally decreases percentage-wise as the ratio of bicarbonate to aluminum hydroxide increases. Thus, when two mols of sodium bicarbonate are reacted with one mol of aluminum hydroxide, the product contains less than one mol of $Na_2O$ per mol of $Al_2O_3$. The remainder goes into soluble by-products. The known composition $NaHCO_3 \cdot Al(OH)_3$ in a superior form having very high acid consuming power can be prepared by heating sodium bicarbonate and aluminum hydroxide together in a mol ratio of about 3:1. Products having a very low ratio of alkali metal oxide to alumina can also be made by the instant dry heating process, for example by heating an alkali metal bicarbonate and aluminum hydroxide in a very low mol ratio, down to about 0.05:1.

As a rule the desired buffer material is the insoluble reaction product of bicarbonate and aluminum prepared as described above. In that case the soluble by-products can be removed by washing with water. Sometimes it is desired to recover the entire reaction product, including both soluble and insoluble portions, for use as a buffer material.

The above described method for reacting aluminum hydroxide with an alkali metal or ammonium bicarbonate can be used to make both new products and buffers of presently known composition, depending on the ratio of bicarbonate to aluminum hydroxide.

Sodium bicarbonate is a mild alkali which has long been used for the treatment of "acid stomach" and allied mild stomach upsets. It is not suitable for treatment of gastric hyperacidity such as those encountered, for example, in a person suffering from ulcers. In the first place, the alkaline nature of sodium bicarbonate establishes too high a pH when there is no excess acid present in the stomach. Secondly, when excess acid is released into the stomach, the capacity of sodium bicarbonate to neutralize this excess acid is too low, so that much of the excess acid remains un-neutralized. Furthermore, sodium bicarbonate reacts with acid to release carbon dioxide, which causes eructation.

Gelatinous aluminum hydroxide has been suggested for use as an antacid material for the treatment of gastric hyperacidity. Aluminum hydroxide is substantially water insoluble, and substantially neutral, and at the same time is capable of reacting with acid and buffering a solution at a slightly acid pH in the neighborhood of about 4. However, aluminum hydroxide reacts too slowly with acid to provide the rapid relief which is desired when acid is suddenly released in the stomach of a person suffering from gastric hyperacidity. Furthermore, the acid consuming power of aluminum hydroxide is rather low, making it necessary for a person to take fairly large quantities of the material in order to provide effective relief.

The more highly reactive commercial aluminum hydroxide gels sold for use as antacids generally contain small amounts of sodium bicarbonate. These reaction products of sodium bicarbonate and aluminum hydroxide impart some of the advantages and mitigate some of the disadvantages of both aluminum hydroxide and sodium bicarbonate. These reaction products are nearly neutral, so as not to create an undesirably high pH when no excess acid is present. They cause less eructation and acid rebound than sodium bicarbonate, although they do cause these reactions to some extent. At the same time they neutralize acids more rapidly than does pure aluminum hydroxide. Although these products are superior to either sodium bicarbonate or aluminum hydroxide alone, nonetheless they have a lower acid consuming capacity than is desirable.

New and superior buffer compositions of this invention, in which the atomic ratio of sodium to aluminum is about 0.15:1 to about 0.5:1, are prepared by dry heating a mixture of a finely divided alkali metal or ammonium bicarbonate and aluminum hydroxide in the mol ratio of about 0.3 to about 2 mols of bicarbonate per mol of aluminum hydroxide. The resulting products have outstandingly high acid consuming powers, exceeding those of presently known reaction products of alkali metal bicarbonates and aluminum hydroxide. Surprisingly the new compositions of this invention have higher acid consuming powers than previously known compositions having higher alkali metal to aluminum ratios. The lower content of both alkali metal and carbon dioxide in the new compositions, as compared to previously known buffer and antacid compositions, mitigates the problems of eructation, acid rebound, and alkalosis which accompany such known materials.

The novel products described in the preceding paragraph can be represented empirically, on the anhydrous basis in terms of the constituent oxides, by the formula $$aM_2O \cdot Al_2O_3 \cdot bCO_2$$

where M is an alkali metal. Preferred alkali metals are sodium and potassium, particularly the former. The value of $a$ ranges from about 0.15 to about 0.5, and the value of $b$ ranges from about 0.3 to about 1.

Generally carbon dioxide and alkali metal are present in compositions of this invention in the same proportion as in sodium bicarbonte. In this case the value of $b$ is twice the value of $a$. These products can be represented alternatively, on the anhydrous basis, by the empirical formula $$bMHCO_3 \cdot Al_2O_3$$

where M and $b$ are as previously defined.

The novel compositions of this invention include novel compositions differing only in water content, which may be represented on the anhydrous basis either by the empirical formula $$0.5Na_2O \cdot Al_2O_3 \cdot CO_2$$

or by the empirical formula $$NaHCO_3 \cdot Al_2O_3$$

For instance, one salt conforming to the above empirical formulas has the composition $$NaHCO_3 \cdot Al_2O_3 \cdot 2H_2O$$

when air-dried or spray-dried at room temperature, and the composition $$NaHCO_3 \cdot Al_2O_3 \cdot H_2O$$

when dried to constant weight at 120° C. The monohydrate has the structural formula

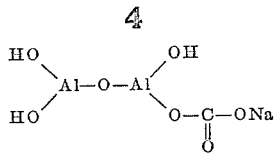

This compound reacts rapidly with hydrochloric acid, neutralizing the acid somewhat less than completely, so that the final pH of a stoichiometric mixture is below 6, but above 3. It possesses a large acid-consuming power, so that a small amount of the antacid preparation can provide substantial relief of hyperacidity. The product is chemically well-defined and stable, so that it can be prepared in large quantities, and it may be stored and handled without decomposing, or undergoing other significant chemical change. It can be produced from inexpensive, readily available chemicals, and by an economically feasible procedure. Finally, it will not produce undesirable side reactions in the human body after performing its primary function of acid-neutralization.

When 30 mg. of this compound is added to 20 ml. of 0.01 N hydrochloric acid, the pH value is raised from below 2 to above 4 in approximately 30 seconds, and shortly thereafter the solution buffers at a pH between 4 and 5.

Other novel reaction products of this invention which are believed to be compounds, may be represented on the anhydrous basis by either the empirical formula $$2Na_2O \cdot Al_2O_3 \cdot 4CO_2$$

or the empirical formula $$4NaHCO_3 \cdot Al_2O_3$$

These compounds also are excellent antacids and buffer compositions, having high acid consuming power and reacting rapidly with hydrochloric acid.

Analogous to the novel reaction products of alkali metal bicarbonates and aluminum hydroxide are novel reaction products of ammonia and aluminum hydroxide. These may be represented, on the anhydrous basis, by the empirical formula $$2aNH_3 \cdot Al_2O_3 \cdot bCO_2$$

where $a$ and $b$ are as previously defined. Preferred products of this type are those in which the ratio of ammonia to carbon dioxide is the same as in ammonium bicarbonates, and they may be written alternatively on the anhydrous basis by the empirical formula $$bNH_4HCO_3 \cdot Al_2O_3$$

These compositions, like their alkali metal analogs, are antacids and buffer compositions having high acid consuming power and rapid reaction time with hydrochloric acid.

Other novel buffer compositions which can be prepared according to this invention are reaction products of aluminum hydroxide and an alkali metal or ammonium acid phosphate. A small amount of an alkali metal bicarbonate can also be included in these products if desired. These products are made by heating a dry mixture of aluminum hydroxide, an alkali metal acid phosphate such as disodium phosphate or dipotassium phosphate, and, if desired, an alkali metal bicarbonate. The mol ratio of alkali metal acid phosphate to aluminum hydroxide can be varied widely, from about 0.2 to about 1.0 mols of alkali metal acid phosphate per mol of aluminum hydroxide. The presence of alkali metal bicarbonate in the reagent mixture is optional; amounts of alkali metal bicarbonate range from 0 to about 0.2 mols per mol of aluminum hydroxide.

While the products of this invention may be represented empirically as composites of their constituent oxides and anhydrides, these products are believed to be complex polymers in which the aluminum atoms are joined together, partially through hydrogen-bonded hydroxyl groups, and partially through oxide chains. The dry heating process of this invention is believed to increase the number of hydrogen-bonded hydroxyl linkages and to decrease the number of oxygen bridges. This is regarded as the most probable explanation for the extraordinarily high acid consuming power of buffers prepared according to this invention.

The aluminum hydroxide reagent of this invention is a finely divided material which preferably has been obtained by precipitation from an acidic aluminum salt. Suitable forms of aluminum hydroxide can be obtained by precipitation from aluminum chloride, aluminum sulfate, or the like, using any of the well known mildly alkaline precipitants such as ammonium hydroxide, sodium bicarbonate, and the like. A strongly alkaline compound such as sodium hydroxide or sodium carbonate can also be used as the precipitant, provided the addition is carefully controlled so that none of the precipitated aluminum hydroxide is redissolved in excess alkali.

The precipitated aluminum hydroxide may be dried if desired to remove excess water. Care should be taken, however, not to dry the precipitate under severe conditions, i.e., at high temperatures for a long period of time. Drying under severe conditions adversely affects the aluminum hydroxide as a reagent in the manufacture of the novel composition herein.

The desired particle size of the aluminum hydroxide (not exceeding 230 mesh) may be obtained either by precipitation of the aluminum hydroxide as a finely divided precipitate, or by grinding a coarser aluminum hydroxide to the desired particle size.

This invention will now be described with reference to specific embodiments thereof as illustrated in the examples which follow:

*Example 1*

A commercial aluminum hydroxide dried gel containing 30.7% by weight Al, 3.0% Na, and 5.7% $CO_2$ (equivalent to a composition having the empirical formula 0.114 $NaHCO_3 \cdot Al(OH)_3$) was ground until it would pass a No. 230 sieve, and 100 grams of this material was mixed with the quantity of minus 230 mesh sodium bicarbonate indicated in Table I below. The commercial dried gel had an acid consuming power of 100 milliliters of 0.1 N hydrochloric acid per gram. The mixture of aluminum hydroxide gel and sodium bicarbonate was heated in a loosely covered porcelain casserole for three hours at 120° C.

The mol ratio of sodium bicarbonate to aluminum hydroxide in the reagent mixture, the composition of the water-insoluble product, and the acid consuming power (ACP) of said product in milliliters of 0.1 N hydrochloric acid per gram, are given in Table I below.

TABLE I

| Run No. | $NaHCO_3:Al(OH)_3$ | | ACP, ml./g. | Percentage by weight of— | | | |
|---|---|---|---|---|---|---|---|
| | Amount of $NaHCO_3$ (g.) | Reagent Mol Ratio | | Na | Al | $CO_2$ | $H_2O$ |
| 1 | 11 | 0.23:1 | 200 | 3.4 | 30.5 | 6.5 | 30.5 |
| 2 | 22 | 0.34:1 | 270 | 4.0 | 30.5 | 7.5 | 30.0 |
| 3 | 44 | 0.57:1 | 290 | 4.8 | 29.1 | 9.0 | 28.2 |
| 4 | 87 | 1.03:1 | 230 | 6.5 | 27.5 | 12.3 | 26.0 |
| 5 | 175 | 1.94:1 | 240 | 12.4 | 23.0 | 29.0 | 17.5 |
| 6 | 260 | 3.61:1 | 270 | 16.0 | 19.0 | 30.0 | 12.5 |
| 7 | 520 | 5.65:1 | 295 | 21.3 | 13.1 | 40.9 | 4.5 |

The compositions of the above products can be represented as follows:
Run No. 1: $0.13Na_2O \cdot Al_2O_3 \cdot 0.26CO_2 \cdot 3H_2O$.
Run No. 2: $0.15Na_2O \cdot Al_2O_3 \cdot 0.30CO_2 \cdot 3H_2O$.
Run No. 3: $0.19Na_2O \cdot Al_2O_3 \cdot 0.38CO_2 \cdot 2.9H_2O$.
Run No. 4: $0.28Na_2O \cdot Al_2O_3 \cdot 0.55CO_2 \cdot 2.8H_2O$.
Run No. 5: $0.63Na_2O \cdot Al_2O_3 \cdot 1.55CO_2 \cdot 2.3H_2O$.
Run No. 6: $0.99Na_2O \cdot Al_2O_3 \cdot 1.94CO_2 \cdot 1.98H_2O$ (this corresponds, within the limits of experimental error, to $Na_2O \cdot Al_2O_3 \cdot 2CO_2 \cdot 2H_2O$).
Run No. 7:

$$1.91Na_2O \cdot Al_2O_3 \cdot 3.8CO_2 \cdot 1.03H_2O$$

(this corresponds, within the limits of experimental error, to $2Na_2O \cdot Al_2O_3 \cdot 4CO_2 \cdot H_2O$).

*Example 2*

Mixtures of sodium bicarbonate and aluminum hydroxide were heated in the dry state at 120° C. for 2 hours. The amounts of sodium bicarbonate and aluminum hydroxide (in both weight and mol ratios), and the percentages by weight of water-soluble material, Na, and $CO_2$ in the reaction product are shown in Table II below.

TABLE II

| $NaHCO_3:Al(OH)_3$ ratio | | | Weight percentage of— | | |
|---|---|---|---|---|---|
| Sample | Weight | Mol | Solubles | Na | $CO_2$ |
| 1 | 2:1 | 1.86:1 | 36 | 8.7 | 26 |
| 2 | 1:1 | 0.93:1 | 22 | 8.6 | 17 |
| 3 | 0.67:1 | 0.62:1 | 21 | 5.5 | 15 |
| 4 | 0.5:1 | 0.46:1 | 14 | 5.0 | 13.5 |
| 5 | 0.4:1 | 0.39:1 | 10 | 2.9 | 10.5 |
| 6 | 0.2:1 | 0.20:1 | 6 | 1.7 | 7 |
| 7 | 0.1:1 | 0.10:1 | 4 | 0.9 | 6 |
| 8 | 0.05:1 | 0.05:1 | 2 | 0.2 | 4 |

*Example 3*

100 grams of the commercial aluminum hydroxide gel described in Example 1 was mixed with 104 grams of potassium bicarbonate. The mol ratio $$KHCO_3:NaHCO_3:Al(OH)_3$$

in the reagent mixture was 0.91:0.114:1. This mixture was heated in a loosely covered porcelain casserole for three hours at 120° C. The product contained 27.0% by weight aluminum (as Al), 11.0% $CO_2$, and 26.0% $H_2O$. This corresponds to a $CO_2:Al_2O_3$ mol ratio of 0.5 and a $H_2O:Al_2O_3$ mol ratio of 2.9. The resulting product had an acid consuming power of 285 milliliters of 0.1 N hydrochloric acid per gram.

*Example 4*

One hundred grams of the commercial aluminum hydroxide gel described in Example 1 was heated with 82 grams of ammonium bicarbonate in a loosely covered porcelain casserole for three hours at 120° C. The mol ratio of $NH_4HCO_3:NaHCO_3:Al(OH)_3$ in the reagent mixture was 0.91:0.114:1. The composition of the product, in percentage by weight, was: Al, 28.2%; $CO_2$, 10.1%; $H_2O$, 27.5%. This corresponds to mol ratios of 0.44 mols of $CO_2$ and 2.9 mols of $H_2O$ per mol of $Al_2O_3$.

*Example 5*

One hundred grams of the aluminum hydroxide gel described in Example 1 was mixed with 183 grams (1.03 mols) of disodium phosphate dihydrate, $Na_2HPO_4 \cdot 2H_2O$, and the mixture heated in a loosely covered porcelain casserole for three hours at 120° C. The ratio $$Na_2HPO_4 \cdot 2H_2O : NaHCO_3 : Al(OH)_3$$

in the reagent mixture was 0.90:0.114:1. The resulting product had an acid consuming power of 150 milliliters of 0.1 N hydrochloric acid per gram.

*Example 6*

One hundred grams of the aluminum hydroxide gel described in Example 1 was heated with 181 grams (1.04 mols) of dipotassium phosphate in a loosely covered porcelain casserole for three hours at 120° C. The resulting product had an acid consuming power of 170 milliliters of 0.1 N hydrochloric acid per gram.

All of the other products prepared according to Examples 1 and 5 through 8 had greater acid consuming power than the commercial aluminum hydroxide gel which was used as the starting material. The products having greatest acid consuming power were those in which either sodium bicarbonate or potassium bicarbonate was reacted with the aluminum hydroxide gel. Preferred products of this invention are those made by dry heating a mixture of aluminum hydroxide with sodium bicarbonate, potassium bicarbonate, or both, in proportions such that the mol ratio of total alkali metal (as $M_2O$) to aluminum (as $Al_2O_3$) in the product is in the range of 0.15 to 0.5. Surprisingly, the acid consuming power of the product reaches a maximum when the alkali metal bicarbonate to aluminum hydroxide mol ratio is within this range, and diminishes at either higher or lower ratios of alkali metal bicarbonate to aluminum hydroxide. As can be seen in Examples 1 and 5 through 8, the aluminum hydroxide reagent does not have to be pure aluminum hydroxide; compositions or mixtures formed by the interaction of an alkali metal bicarbonate with aluminum hydroxide having a lower alkali metal to aluminum ratio than that desired in the final product can be used instead.

The compositions of this invention are buffers which have a very large acid consuming power at a pH of about 4.0 to about 4.5. These products may be used in industrial reactions where it is desired to maintain close control of the pH at a buffer pH of about 4.0 to about 4.5. These products are also very valuable as buffers or antacid compounds for the relief of gastric hyperacidity. In addition to establishing a buffer of about 4.1 to about 4.5, which is a very desirable level in the human body, these products are substantially neutral and not alkaline in the absence of acid, and have the power to react very rapidly with acid.

While the present invention has been described with reference to specific embodiments thereof, it is understood that the scope of this invention shall be measured only by the scope of the appended claims.

What is claimed is:

1. A process for preparing buffering compositions which comprises heating in the solid state and in the absence of free water at a temperature of 80° to 180° C. a mixture of finely-divided aluminum hydroxide and at least one finely-divided salt selected from the group consisting of the alkali metal and ammonium bicarbonates, the mol ratio of the total amount of said bicarbonates to aluminum hydroxide being in the range of about 0.05:1 to about 8:1 and recovering the desired reaction product.

2. The process of claim 1 wherein the particle size of said aluminum hydroxide and of said salt is not greater than 230 mesh.

3. A process for preparing buffering compositions which comprises heating in the solid state and in the absence of free water at a temperature of about 80° to about 200° C. a mixture of finely-divided aluminum hydroxide and a finely-divided alkali metal bicarbonate, the mol ratio of alkali metal bicarbonate to aluminum hydroxide being in the range of about 0.05:1 to 8:1.

4. The process of claim 3 wherein the mol ratio of alkali metal bicarbonate to aluminum hydroxide is about 0.3:1 to 2:1.

5. The process of claim 4 wherein said alkali metal bicarbonate is sodium bicarbonate.

6. A buffer composition comprising a hydrated or anhydrous compound having, on the anhydrous basis, the empirical formula:

$$2Na_2O \cdot Al_2O_3 \cdot 4CO_2$$

7. A compound according to claim 6 of the formula:

$$2Na_2O \cdot Al_2O_3 \cdot 4CO_2 \cdot H_2O$$

References Cited

UNITED STATES PATENTS

| 2,783,124 | 2/1957 | Grote | 23—315 |
| 2,783,127 | 2/1957 | Grote | 23—14 X |
| 2,797,978 | 7/1957 | Beekman | 23—315 X |
| 3,115,387 | 12/1963 | Lewin | 23—14 |

OTHER REFERENCES

Babor et al., "General College Chemistry," 1940, p. 66.

Remy, "Treatise on Inorganic Chemistry," 1956, vol. II, pp. 743–748.

MILTON WEISSMAN, *Primary Examiner.*

MAURICE A. BRINDISI, *Examiner.*